US012610968B2

(12) United States Patent
    Christensen et al.

(10) Patent No.:     US 12,610,968 B2
(45) Date of Patent:        Apr. 28, 2026

(54) WHIPPING AGENT FOR FOOD PRODUCTS AND USE THEREOF

(71) Applicant: INTERNATIONAL N&H DENMARK APS, Kongens Lyngby (DK)

(72) Inventors: Finn Hjort Christensen, Brabrand (DK); Finn Madsen, Åbyhøj (DK); Leo Andersen, Hjortshoj (DK)

(73) Assignee: INTERNATIONAL N&H DENMARK APS, Kongens Lyngby (DK)

( * ) Notice:    Subject to any disclaimer, the term of this patent is extended or adjusted under 35 U.S.C. 154(b) by 491 days.

(21) Appl. No.: 17/246,157

(22) Filed:    Apr. 30, 2021

(65)                Prior Publication Data

US 2022/0015386 A1       Jan. 20, 2022

Related U.S. Application Data

(63) Continuation of application No. 15/601,578, filed on May 22, 2017, now abandoned, which is a continuation of application No. 14/349,272, filed as application No. PCT/EP2012/069530 on Oct. 3, 2012, now abandoned.

(60) Provisional application No. 61/566,888, filed on Dec. 5, 2011, provisional application No. 61/542,422, filed on Oct. 3, 2011.

(30)        Foreign Application Priority Data

Oct. 3, 2011    (EP) ..................................... 11183702
Dec. 5, 2011    (EP) ..................................... 11191984

(51) Int. Cl.
    *A23G 9/32*        (2006.01)
    *A23G 9/38*        (2006.01)
    *A23G 9/40*        (2006.01)
    *A23G 9/42*        (2006.01)
    *A23J 3/14*        (2006.01)
    *A23L 29/10*       (2016.01)
    *A23P 30/40*       (2016.01)

(52) U.S. Cl.
    CPC ............... *A23G 9/327* (2013.01); *A23G 9/38* (2013.01); *A23G 9/40* (2013.01); *A23G 9/42* (2013.01); *A23J 3/14* (2013.01); *A23L 29/10* (2016.08); *A23P 30/40* (2016.08); *A23V 2002/00* (2013.01)

(58) Field of Classification Search
    CPC . A23G 9/327; A23G 9/38; A23G 9/40; A23G 9/42; A23P 30/40; A23J 3/14; A23L 29/10; A23V 2002/00; A23V 2200/246; A23V 2250/182; A23V 2250/548; A23V 2250/192
    USPC ......................................................... 426/565
    See application file for complete search history.

(56)                References Cited

U.S. PATENT DOCUMENTS

2014/0017382 A1*    1/2014    Gunes ..................... A23G 9/40
                                                        426/573

* cited by examiner

*Primary Examiner* — Subbalakshmi Prakash

(57)                ABSTRACT

The present invention relates to a whipping agent comprising protein and emulsifier for aerated food products, such as for sorbet and sherbet applications. The present invention also relates to whipped food products such as sorbets and sherbets comprising this whipping agent and a method for making the same. The present invention also relates to complexes between a protein and an emulsifier, use thereof and a method for producing the complexes.

6 Claims, 4 Drawing Sheets

Light microscopy        Polarized light microscopy        CLSM

Figure 1:
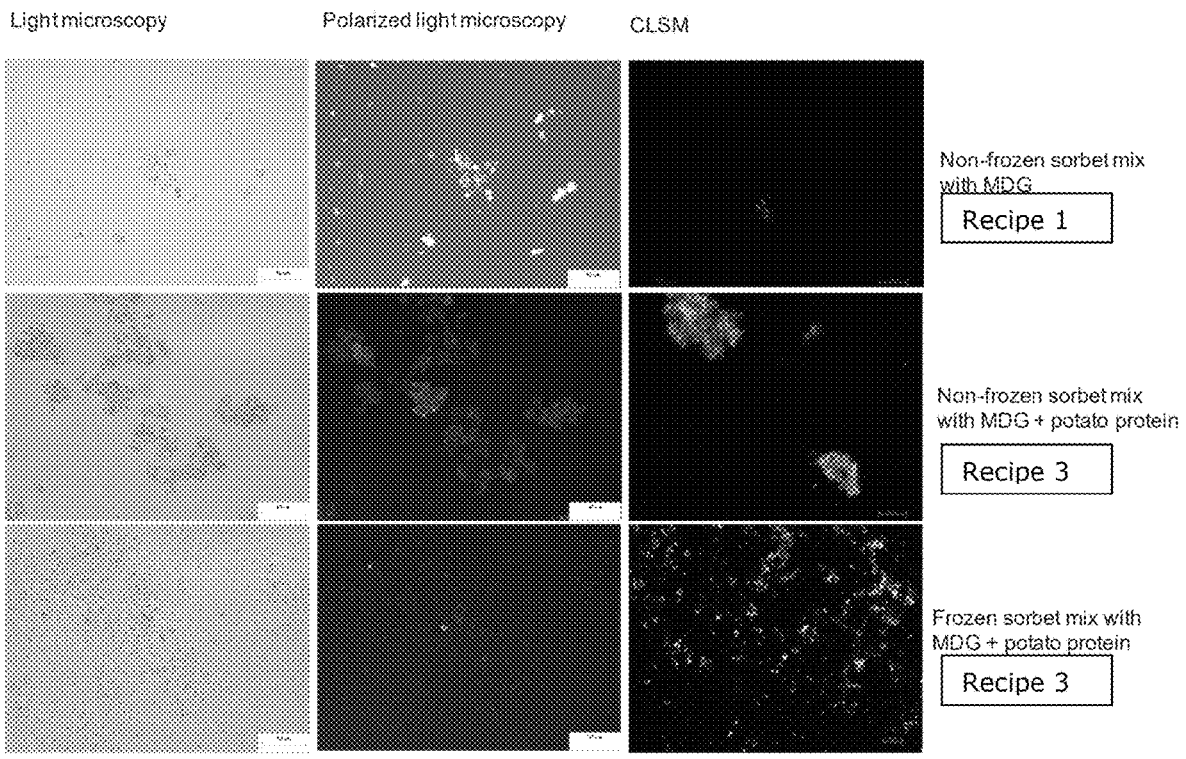

Non-frozen sorbet mix with MDG
Recipe 1

Non-frozen sorbet mix with MDG + potato protein
Recipe 3

Frozen sorbet mix with MDG + potato protein
Recipe 3

Freezing and ultra turrax treatments

═══ MDG + potato protein (1)

▬▬▬ MDG + potato protein, F (2)

▬▬▬ MDG + potato protein, F+UT (3)

WHIPPING AGENT FOR FOOD PRODUCTS AND USE THEREOF

CROSS-REFERENCE TO RELATED PATENT APPLICATIONS

This patent claims priority as a continuation under 35 USC § 120 to U.S. patent application Ser. No. 15/601,578 (filed May 22, 2017), which, in turn, claims priority as a continuation under 35 USC § 120 to U.S. patent application Ser. No. 14/349,272 (filed Apr. 2, 2014), which, in turn, claims priority under 35 USC § 371 as a national phase of Int'l Patent Appl. PCTEP2012/069530 (filed Oct. 3, 2012; and published as Int'l Publ. No. WO2013/050412 on Apr. 11, 2013), which, in turn, claims priority to U.S. Provisional Patent Appl. Nos. 61/542,422 (filed Oct. 3, 2011) and 61/566,888 (filed Dec. 5, 2011) and European Patent Appl. Nos. 11183702.7 (filed Oct. 3, 2011) and 11191948.1 (filed Dec. 5, 2011). The entire text of each of the above-referenced patent applications is incorporated by reference into this patent.

FIELD OF THE INVENTION

The present invention relates to a combination of a protein and an emulsifier and the use of this combination in a whipping agent for aerated food products, such as sherbet, sorbet, ice cream, mousse, milk shakes, confectionery, etc. The present invention also relates to complexes between a protein and an emulsifier, use thereof and a method for producing the complexes.

The present invention also relates to whipped food products comprising this whipping agent, and a method for making the same.

BACKGROUND OF THE INVENTION

Today much of the novelty and distinction between different types of food come from aeration of the food, creating new and desired textures. Also problems with obesity in western populations have increased the interest in aeration of food to lower the energy density of such food. This again put strong requirements on these new types of aerated food developments in relation to whipping power and long term stability, such as storage stability.

Considerable scientific work has been performed to improve stability of aerated products/foams. Especially the use of surface active particles of nanoscale has been very efficient in increasing foam stability, e.g. combinations of surface active particles and proteins have been investigated by Murray et al (Food Hydrocolloids 25 (2011) 627-638). Boots et al has investigated the effect of protein stability on protein/monoglyceride interactions (Chemistry and Physics of Lipids 117 (2002) 75-81).

A major problem is still to obtain such surface active particles, fulfilling the demands of being food grade and of sufficient small size (preferably nanoscale). Creation of ionic emulsifier-protein interaction structures has been described in patent US 20100047358A1. The structure is a protein supramolecular core, interacting with an ionic emulsifier, making a vehicle for bioactive substances.

Complexes between ionizable emulsifiers and ionizable polypeptides and/or ionizable hydrocolloids for use as fat mimetics has been described in patent application WO 93/21784.

Sorbet and sherbet are two categories of aerated frozen dessert products. Sorbets can be defined as water ice with a certain overrun, typically 20-100%.

Whereas sorbets normally do not contain fat and non-fat milk solids, sherbets traditionally have a certain amount of fat, typically 1-3% (w/w), and/or non-fat milk solids, typically 1-4% (w/w).

Preferences regarding the consistency and texture of sorbets vary considerably depending on the consumer group, legislation and application. The possibilities are many, ranging from very fresh, cold-eating and coarse air distribution to very creamy, warm-eating types with comparatively small ice crystals and fine air distribution.

In order to obtain the desired characteristic in sorbets and sherbets, it is often necessary to incorporate a whipping agent. Whipping agents have considerable influence on the air incorporation and distribution in sorbets and sherbets, and provide stable foam and enable the desired overrun to be obtained.

Good air dispersion is very important for the consistency and creaminess of sorbet and sherbet products, a fine stable dispersion giving the impression of a creamy sensation.

Brittleness is also largely controlled by whipping agents, which together with the correct stabiliser dosage, impart smoothness to the end products.

The range of whipping agents in this area is continuously on the increase and, today, a wide selection is available. Some of these agents also have a stabilising effect. Types of whipping agents that are typically used in sorbets and sherbets are milk proteins, vegetable proteins, such as hydrolyzed pea and soya protein, gelatine, propylene glycol alginate and derivatives of cellulose, such as methyl cellulose and hydroxypropyl methylcellulose.

However, often these classic sorbet and sherbet whipping agents fail to provide sufficient aeration, giving insufficient amount of air incorporation in the sorbet or sherbet product, which leads to the desired overrun not being obtained. This very coarse air distribution and too low overrun sometimes give rise to products looking like Swiss cheese with big air bubbles—when drawn from the freezer. Some of the consequences of insufficient overrun is, not only poor quality, but also poor economy for the producers as air is the cheapest ingredient in sorbets and sherbets.

The presence of terpens, coming from added fruit product, such as juice, concentrates or puree or coming from flavourings added, can negatively affect the whipping capability of sorbet and sherbet mixes.

So there exists a need for an efficient whipping agent for whipped food products such as sorbet and sherbet applications which can provide whipping even under difficult conditions, such as in the presence of terpens.

There is a further need for developing whipping agents that are able to facilitate aeration of different types of food and secure good foam stability.

Although protein, such as vegetable protein, and emulsifiers perform poorly when they are used separately as the only component in a whipping agent, it has surprisingly been found that when the protein and the emulsifier are used in combination they act as a very efficient whipping agent in whipped food products such as sorbet and sherbet applications.

OBJECT OF THE INVENTION

It is an object of embodiments of the invention to provide an efficient whipping agent for food products such as frozen whipped food products applications, whipped food products such as sorbets and sherbets based on this whipping agent and a method of making the same.

SUMMARY OF THE INVENTION

It has been found by the present inventors that a whipping agent comprising emulsifier and protein such as vegetable protein provides improvements in food products such as an excellent air distribution and/or overrun and/or smoother texture and/or better heat shock stability and/or being able to provide whipping in the presence of terpens, especially in frozen whipped food products such as sorbets and sherbets.

Accordingly the invention relates to a whipping agent comprising an emulsifier and a protein, such as vegetable protein. In one aspect, the whipping agent comprises an emulsifier and a protein capable of forming complexes. The invention further relates to the use of the herein described whipping agent for making a whipped food product, such as a frozen food product for example sorbet or sherbet. In one aspect, the use of the herein described whipping agent provides an improvement in air incorporation and distribution and/or overrun and/or smoother texture and/or better heat shock stability and/or being able to provide whipping in the presence of terpens in a whipped food product, such as sorbets and sherbets.

The invention also relates to a whipped food product, such as a frozen whipped food product comprising a whipping agent, which whipping agent comprises emulsifier and protein such as vegetable protein. In a further aspect, the whipped frozen food product is sorbet or sherbet.

The invention also relates to a method of improving air incorporation and distribution and/or overrun and/or smoother texture and/or better heat shock stability and/or being able to provide whipping in the presence of terpens in a whipped food product such as a whipped frozen food product for example sorbet and sherbet by adding a whipping agent, which whipping agent as described herein comprises emulsifier and protein, such as vegetable protein, and whipping the product.

The invention relates to a method of preparing a whipped food product by adding a whipping agent as described herein, and whipping the product. In a further aspect, the product is both whipped and frozen.

The invention also further relates to a method of preparing whipped food products such as sorbet or sherbet comprising adding an emulsifier and a protein, such as vegetable protein, and the further ingredients and whipping said product, wherein the combination of emulsifier and protein, such as vegetable protein produces a synergistic effect on the air incorporation and distribution and/or overrun and/or smooth texture and/or heat shock stability and/or being able to provide whipping in the presence of terpens of the food product.

The invention also relates to a method for preparing complexes of an emulsifier and a protein comprising a step of heating a composition comprising the emulsifier and the protein to a temperature at or above the melting temperature of the emulsifier and/or at a temperature wherein the emulsifier creates micelles or mesophasic structures, followed by a step of cooling the heated composition, optionally to below the melting temperature of the emulsifier and/or to a temperature where the emulsifier is transformed into a crystalline or liquid crystalline structure.

The invention also relates to a method for preparing a whipped food product such as sorbet or sherbet by adding a whipping agent as defined herein, and whipping and optionally freezing the product, comprising a step of forming complexes between an emulsifier and a protein, and optionally forming particles of the complexes.

The invention also relates to a complex of an emulsifier and a protein such as formed by heating of a composition comprising the emulsifier and the protein to a temperature at or above the melting temperature of the emulsifier and/or at a temperature wherein the emulsifier creates micelles or mesophasic structures, followed by cooling of the mixture, optionally to below the melting temperature of the emulsifier and/or to a temperature where the emulsifier is transformed into a crystalline or liquid crystalline structure. The invention also relates to whipped products as defined herein comprising such complex.

FIGURES

FIG. 1 shows evaluation of sorbet mixes (recipe 1 and 3 from example 5) using light microscopy, polarised light microscopy and confocal laser scanning microscopy as further described in example 5.

Figure 2:
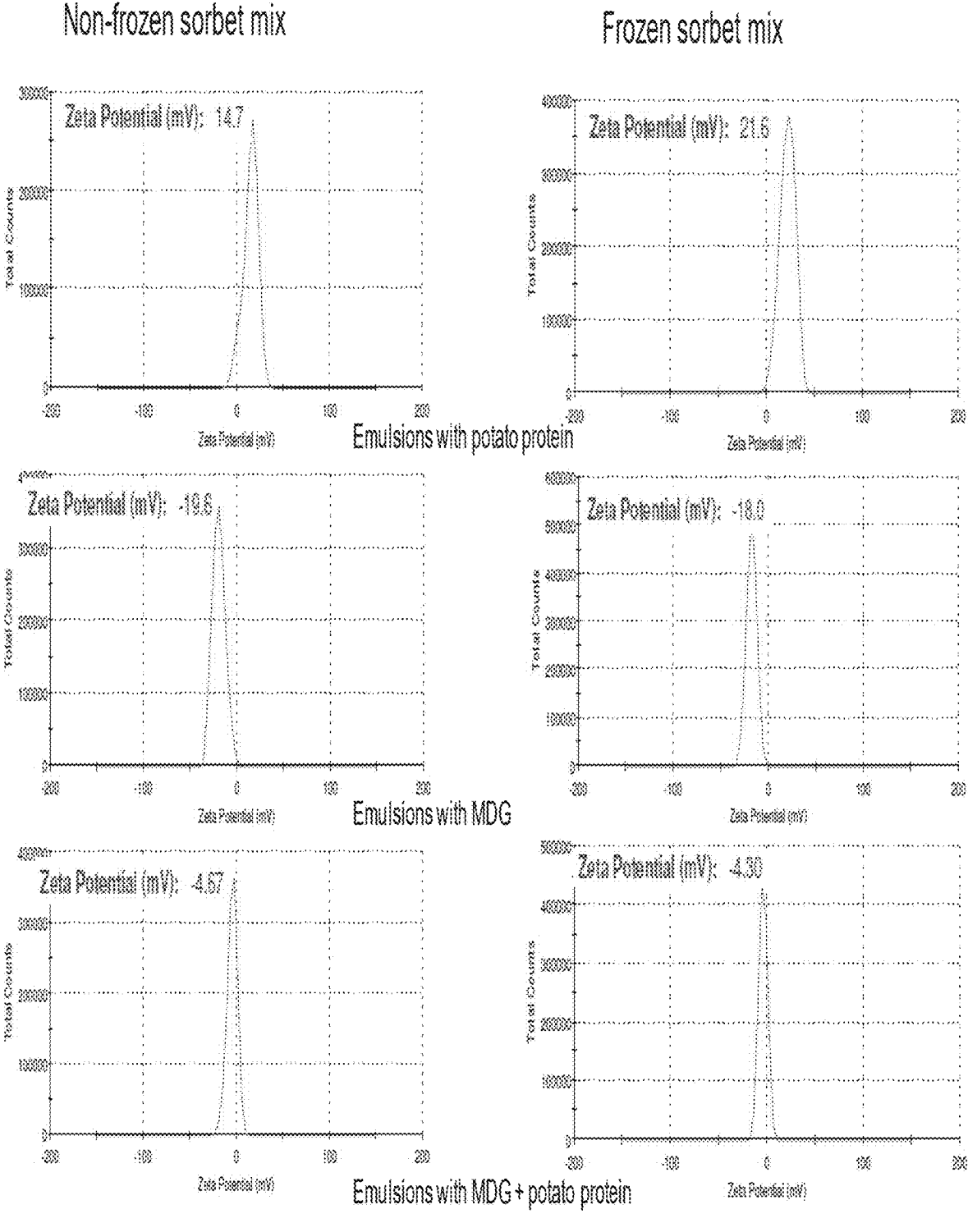

FIG. 2 shows the zeta potential of 10% (w/w) rapeseed oil emulsions (o/w) produced from sorbet mixes from example 5, recipe 1, 2 and 3.

Figure 3:
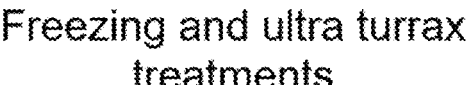
Figure 3:
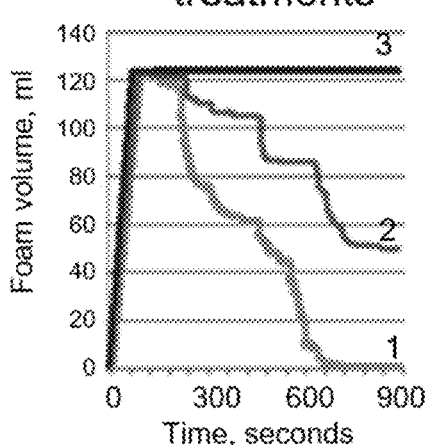
Figure 3:
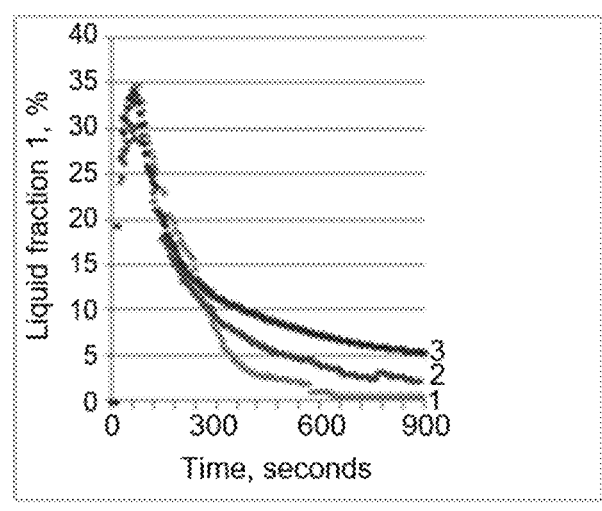

FIG. 3 shows foam volume stability and liquid fraction in the foam as a function of freezing (F) and mechanical treatment (UT) of the sorbet mix from example 5 recipe 3, investigated by foaming the sorbet mix in a FoamScan instrument (Teclis) at 10 C.

Figure 4:
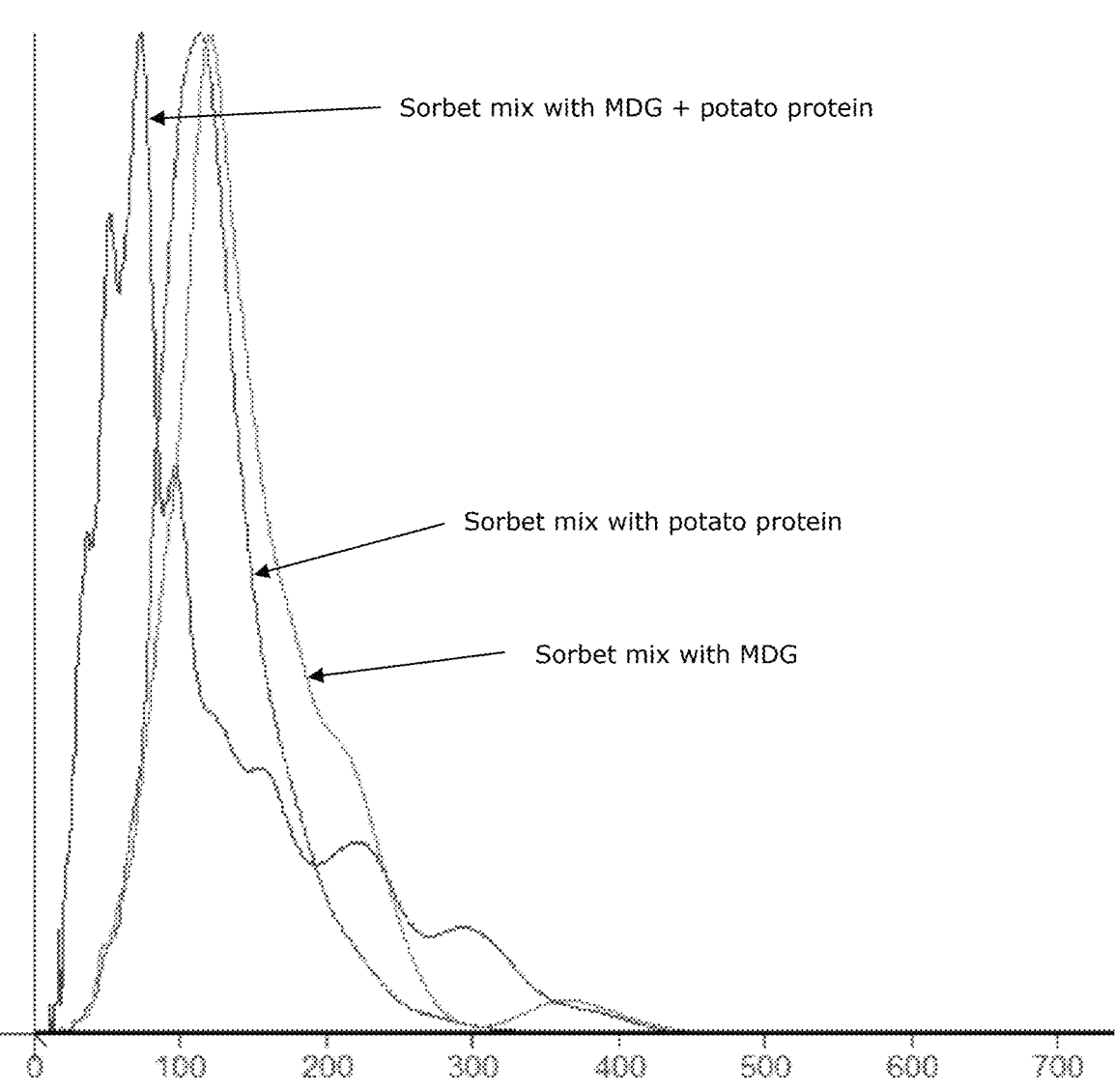

FIG. 4 shows particle size (number distribution) of sorbet mix after freezing and subsequent Ultra Turrax treatment for recipe 1 (sorbet mix with potato protein), 2 (sorbet mix with MDG) and 3 (sorbet mix with MDG and potato protein) of example 5.

DEFINITIONS

In the present context a "whipping agent" as described herein is a mixture of substances with interfacial properties that due to their adsorption dynamic and their presence at the gas-liquid interface will facilitate the uptake and stabilisation of gas cells when the product that contains the whipping agent is aerated.

In the present context the term "emulsifier" means one or more chemical additives that encourage the suspension of one liquid in another, as in the mixture of oil and water in margarine, shortening, ice cream, and salad dressing. In the present context, the emulsifier is different from the protein, such as vegetable protein. In one aspect, the emulsifier is as one or more chemical additives of non-protein origin.

In the present context, 'potato protein' refers to potato protein which has retained most of its intrinsic functional properties, such as emulsifying capacity, solubility, foaming capacity, water binding capacity and thermogelling capacity, on isolation. In one aspect, the potato protein is undenaturated potato protein.

In the present context "freeze denaturate" as described herein means that the protein in question denaturates when frozen and/or during the freezing process.

DETAILED DISCLOSURE OF THE INVENTION

Unless defined otherwise, all technical and scientific terms used herein have the same meaning as commonly understood by one ordinary skilled in the art (e.g. in ice cream and frozen dessert manufacture). Definitions and descriptions of various terms and techniques used in frozen confectionery manufacture are found in "Ice Cream", 6th

Edition, R. T. Marshall, H. D Goff and R. W. Hartel, Kluwer Academic/Plenum Publishers, New York 2003.

The invention relates to the combination of an emulsifier and a protein, such as a vegetable protein, for example potato protein, in a whipping agent for whipped food products such as for example sorbet and sherbet.

The present inventors have found that the combination of an emulsifier and a protein, such as a vegetable protein, provides emulsifier-protein interaction structures or complexes, characterized by being surface active. These structures are able to improve foaming and foam stability very significantly, compared to the foaming and foam stability effect of the individual emulsifier and protein. In one aspect, the invention thus relates to such complex of emulsifier and protein, and the use thereof in a whipping agent.

In a further aspect, the invention relates to a particulate form of the above mentioned complexes. In one aspect, the complexes are in form of a particulate of micro or nanoscale size. These particulate structures are created by running a simple heating process of the constituents in a water phase, allowing the emulsifier to melt and/or form micelles or mesophases. During heating and subsequent cooling particulate complexes may be formed between the emulsifier and the protein. The emulsifier may be of ionic or nonionic origin, preferably non ionic origin and more preferable monodiglycerides. The proteins may be of vegetable origin or animal origin, e.g. dairy proteins. The proteins are preferably undenatured or partly denatured. After cooling, a subsequent homogenization or other strong mechanical treatment may disintegrate the complex aggregate structures to micro or nanoscale particulate emulsifier-protein complexes. In one aspect, the particles have a size of between 10 nanometre to 100 micron, 10 nanometre to 50 micron, 10 nanometre to 10 micron, 10 nanometre to 500 nanometre or 10 nanometre to 150 nanometre. The size of the particles may be measured by a nanoparticle tracking method. The nanoparticle tracking method detects particle size of each individual particle by tracking the Brownian movements of the particle. This is an especially preferred technique compared to more traditional dynamic light scattering techniques, when a broad or a polymodal particle size distribution exist.

Thus in one aspect, provided is a method for preparing complexes of an emulsifier and a protein comprising a step of heating a composition comprising the emulsifier and the protein to a temperature at or above the melting temperature of the emulsifier and/or at a temperature wherein the emulsifier creates micelles or mesophasic structures such as dispersions, followed by a step of cooling the heated composition, optionally to below the melting temperature of the emulsifier and/or to a temperature where the emulsifier is transformed into a crystalline or liquid crystalline structure. In one aspect, said composition is a food product as further defined herein.

In a further aspect, provided is a method for preparing a whipped food product, such as sorbet or sherbet, by adding a whipping agent as defined herein, and whipping and optionally freezing the product, comprising a step of forming complexes between an emulsifier and a protein, and optionally forming particles of the complexes. In yet a further aspect, the complexes in the method for preparing the whipped product are formed during a step of heating the product after addition of the whipping agent comprising the emulsifier and the protein to a temperature at or above the melting temperature of the emulsifier and/or at a temperature wherein the emulsifier creates micelles or mesophasic structures, followed by a step of cooling the heated composition, optionally to below the melting temperature of the emulsifier and/or to a temperature where the emulsifier is transformed into a crystalline or liquid crystalline structure.

In one aspect, the temperature during the heating step may be selected such that the protein or part of the protein is denatured or unfolded during this step. In a further aspect, the ionic conditions (including adding calcium ions) and/or the pH during the heating step may be selected such that the protein or part of the protein is denatured or unfolded.

To obtain improved complexing and to obtain improved disintegration of the complex aggregates into particulates of smaller size, various supplementary process steps afterwards may be advantageous. These treatments can be, but is not limited to, freezing or changing pH or changing ionic conditions (including adding Ca ions), either before or during or after the mechanical treatment. In one aspect, the complexes are disintegrated into particles by mechanical treatment. Examples of mechanical treatment are high shear treatment for example homogenisation, mechanical treatment and air incorporation in an ice-cream freezer or mechanical treatment with ultra turrax.

In one aspect, a whipped product is prepared by 1) mixing liquid ingredients (for example at a temperature of 20-22° C.) and dry ingredients, separately, 2) mixing dry and liquid ingredients, 3) increasing the temperature of the mixture to between for example 50-90° C., such as between 60-80° C. or between 65-75° C., 4) optionally homogenising for example at 78° C./150 bar and/or pasteurising at for example 84° C./30 sec the heated mixture, 5) cooling the mixture to for example 5° C., 6) ageing for example overnight in ice water (2-5° C.), 7) adding optionally pH regulating agents, flavouring and colouring agents, 8) freezing, light extrusion, for example to a target overrun of 100%, drawing temperature: for example at a temperature of between −5 to −7° C. such as −5.7° C. and filling and overnight freezing in a hardening tunnel at for example −40° C. and stored at for example −20° C. In one aspect, mechanical treatment with Ultra turrax may be performed by treatment at for example 5° C. in an Ultraturrax T25 from Janke&Kunkel IKA Labortechnik, using a S25N-25F dispersion unit, at 20000 rpm for 15 seconds.

In one aspect, the whipped product as disclosed herein has a pH below pH 6 such as between 2.5 and 5.8. In another aspect, the whipped product has a pH between pH 2.5 and 5.

Without wishing to be bound to any theory it is believed that the underlying mechanism for the improved properties of the complexes with regard to their use in a whipping agent is due to the unfolding of the protein such as vegetable protein creating hydrophobic areas that will bind to the emulsifier such as a monoglyceride, when the monoglyceride is transformed into mesophasic or crystalline/liquid crystalline form.

In one aspect, the emulsifier is ionic or non-ionic. In a further aspect, the emulsifier is non-ionic. As examples of emulsifiers mention can be made of mono- and/or diglycerides of saturated or unsaturated fatty acids, and polysorbate. A particular useful emulsifier is mono- and/or diglycerides of saturated or unsaturated fatty acids.

In one aspect, the emulsifier is used in a range of 0.01-1% (w/w), more preferred in a range of 0.05-0.5% (w/w), more preferred in a range of 0.1-0.4% (w/w).

In one aspect, the "mono- and/or diglycerides of saturated or unsaturated fatty acids" are produced from glycerol and natural fatty acids, mainly of plant origin, but also fats of animal origin may be used. In a further aspect, the mono- and/or diglycerides of saturated or unsaturated fatty acids is a mixture of different mono- and/or diglycerides of saturated or unsaturated fatty acids, with a composition similar to partially digested natural fat. In one aspect, a mono-glyceride is an ester in which one hydroxyl group of glycerol is esterified with a fatty acid. In a further aspect, a di-glyceride is an ester in which two hydroxyl groups of glycerol are esterified with two (same or different) fatty acids. The term monoglycerides is commonly used for commercial products produced by the interesterification of fats or oils (triacylglycerols) with glycerol. This process is referred to as glycerolysis, and the products manufactured by this process without further purification by solvent fractionation or molecular distillation techniques are often referred to as mono-diglycerides. Concentrated monoglycerides are usually referred to as distilled monoglycerides. The content of monoacylglycerols in the equilibrium mixture obtained after glycerolysis may vary from 10-60% depending on the glycerol/fat ratio in the reaction mixture. Commercial mono-diglycerides usually contain 45-55% monoacylglycerides, 38-45% diacylglycerides and 8-12% triacylglycerides with traces of un-reacted glycerol and free fatty acids. An alternative production method is direct esterification of fatty acids with glycerol. By using purified fatty acids, this produces mono-diglycerides with a narrow fatty acid distribution. Commercial mono- and diglycerides (E471) are typically based on fatty acids with a chain length of C12-C22. The fatty acids can be saturated or mono-unsaturated or poly-unsaturated. Typical commercial mono- and diglycerides comprises small amount of salts of fatty acids, not more than 6% (w/w), calculated as a sodium oleate. In one aspect, the mono- and diglycerides comprises less than 6% (w/w) salts of fatty acids, calculated as a sodium oleate.

In one aspect, the emulsifier is selected from mono- and/or di-glyceride(s) of saturated or unsaturated fatty acid(s) and mixtures thereof, such as fatty acids with a chain length of C12-C22, such as E471.

In one aspect of the invention, the mono- and/or diglycerides of saturated or unsaturated fatty acids are used in the range of 0.01-1% (w/w), more preferred in a range of 0.05-0.5% (w/w), more preferred in a range of 0.1-0.4% (w/w).

A further component of the whipping agent is a protein such as vegetable protein.

The proteins may be of vegetable or animal origin e.g. dairy proteins.

In a further aspect, the proteins such as vegetable protein are proteins that freeze denaturate. In one aspect, the vegetable protein is selected from the group consisting of pea protein, soy protein and potato protein and mixtures thereof. In one aspect, the vegetable protein is potato protein. In one aspect, the vegetable protein is soy protein. In one aspect, the vegetable protein is pea protein. In one aspect, the vegetable protein is undenatured protein.

The potato protein as described herein is preferably isolated from potato fruit juice, a waste product of the starch manufacturing industry. For the preparation of potato protein both diluted and undiluted potato fruit juice may be used. Other suitable sources of potato protein include for example potato peel extracts and effluent streams from potato processing industries other than the potato-starch industry.

The potato protein may be a low molecular weight (LMW) potato protein having a mean molecular weight of below 40 kDa, more preferably below 35 kDa, even more preferably 5-30 kDa, for example 20-30 kDa. Furthermore, the LMW potato protein may be a protease inhibitor. The potato protein may also be a high molecular weight (HMW)

potato protein having a molecular weight larger than 35 kDa. Typically, HMW potato protein has a mean molecular weight of 40-50 kDa, in particular 40-45 kDa. The potato protein may also be a potato protein hydrolysate. Potato proteins can tentatively be divided into the following three classes: (i) the patatin family, highly homologous acidic 43 kDa glycoproteins (40-50 wt. % of the potato proteins), (ii) basic 5-25 kDa protease inhibitors (30-40 wt. % of the potato proteins) and (iii) other proteins mostly high molecular weight proteins (10-20 wt. % of the potato proteins) (Pots et al., J. Sci. Food. Agric. 1999, 79, 1557-1564).

The potato protein may originate from a native potato protein isolate, such as for example described in WO-A-2008/069650. The potato protein used in the present invention may be obtained in a manner known per se. Existing methods for isolating potato proteins and potato protein fractions include fractionation, ion exchange, gel permeation, ultrafiltration, affinity and mixed-mode chromatography and fractionation by heat coagulation. An example of a suitable isolation method is described in WO-A-2008/069650 of which the contents are hereby incorporated by reference.

An example of a suitable potato protein is Solanic 306 P, a commercial product from Solanic.

In one aspect of the invention, the protein is used in the range of 0.01-5% (w/w), 0.01-3% (w/w), 0.01-1% (w/w), 0.05-0.5% (w/w), 0.05-0.2% (w/w).

In one aspect of the invention, the vegetable protein such as potato protein is used in the range of 0.01-1% (w/w), more preferred in a range of 0.05-0.5% (w/w), more preferred in a range of 0.05-0.2% (w/w).

In one aspect, the weight ratio of the emulsifier to the protein, such as vegetable protein for example potato protein is between 10 and 0.01, between 10 and 0.1, preferably between 8 and 0.5, more preferably between 5 and 1.

In a further aspect, the whipping agent comprises an emulsifier, a protein such as vegetable protein, and optionally stabilisers/thickeners, like e.g. xanthan, pectin, cmc, locust bean gum (LBG) and guar guam.

In a further aspect, the whipping agent comprises an emulsifier, a protein such as vegetable protein, locust bean gum (LBG) and guar guam.

In a further aspect, the whipping agent comprises mono-diglycerides, a vegetable protein such as potato protein, and optionally stabilisers/thickeners, like e.g. xanthan, pectin, cmc locust bean gum (LBG) and guar guam.

In a further aspect, the whipping agent comprises mono-diglycerides, a vegetable protein such as potato protein, locust bean gum (LBG) and guar guam.

In one aspect, the whipping agent of emulsifier and protein such as vegetable protein as described herein is used for making a food product that comprises foam obtained by whipping, wherein the foam comprises the whipping agent.

In a further aspect, the invention relates to the use of a whipping agent as described herein for making a whipped frozen food product such as sorbet or sherbet.

It has surprisingly been found that the whipped frozen food product has improved air incorporation and distribution and/or overrun and/or smoother texture and/or better heat shock stability.

In one aspect, the whipped frozen food product comprising a whipping agent of emulsifier and protein according to the invention has at least one improved property selected from the group of air incorporation, distribution, overrun, smoother texture, whipping in the presence of terpens and better heat shock stability compared to the same whipped frozen food product comprising a whipping agent consisting solely of said emulsifier or said protein.

In a further aspect, the protein such as vegetable protein is used in a range of 0.01-5% (w/w), 0.01-4% (w/w), 0.01-3% (w/w), 0.01-1% (w/w), more preferred in a range of 0.05-0.5% (w/w), more preferred in a range of 0.05-0.2% (w/w) and/or the emulsifier is used in a range of 0.01-1% (w/w), more preferred in a range of 0.05-0.5% (w/w), more preferred in a range of 0.1-0.4% (w/w).

In the present context "air incorporation and distribution" may be evaluated by any method known to the skilled person for example as described in the examples herein by sensory evaluation.

In the present context "smoother texture" may be evaluated by any method known to the skilled person for example as described in the examples herein by sensory evaluation.

In the present context "heat shock stability" may be evaluated by any method known to the skilled person for example as described herein in the examples.

In the present context "overrun" is a measure of the volume of air whipped into the product. In the present context "overrun" may be measured by any method known to the skilled person for example as described herein in the examples.

Synergy of the combination of the two ingredients, the emulsifier, such as mono- and/or di-glyceride(s) of saturated or unsaturated fatty acid(s), and the protein such as vegetable protein, such as potato protein, may be determined by making a food product for example a sorbet or sherbet product with addition of the first and/or the second ingredient of the combination separately and in combination, and comparing the effects; synergy is indicated when the combination produces a better effect than each ingredient used separately.

The invention relates also to a whipped food product such as a frozen food product comprising a whipping agent as described herein. In a further aspect, the whipped food product is an aerated product food product such as a sherbet, sorbet, ice cream, mousse, milk shakes, and confectionery.

In one aspect, the whipped food product comprises less than 4% (w/w) fat, less than 3 (w/w) fat or less than 2% (w/w) fat. In one aspect, the whipped food product comprises less than 2% (w/w) fat such as between 0.5% (w/w) and 2% (w/w) fat. In a further aspect, the whipped food product is a so-called non-fat food product comprising less than 0.5% (w/w) fat. In a further aspect, the whipped food product comprises less than 2% (w/w) milk fat, such as between 1% (w/w) and 2% (w/w) milk fat. In a further aspect, the whipped food product is a non-fat food product comprising less than 0.5% (w/w) milk fat. In one aspect, the whipped food product comprises more than 40% (w/w) water, more than 50% (w/w) water or more than 60% (w/w) water.

In one aspect, a method of preparing such a product is by adding a whipping agent as described herein and whipping and optionally freezing said product.

In one aspect, the food product is sherbet or sorbet.

Sorbet and sherbet are traditionally sweetened with nutritive carbohydrate sweeteners and are characterized by the addition of one or more fruit ingredients or one or more nonfruit-characterizing ingredients.

Examples of optional fruit-characterizing ingredients are any mature fruit or the juice of any mature fruit. The fruit or fruit juice used may be fresh, frozen, canned, concentrated, or partially or wholly dried. The fruit may be thickened with pectin or other optional ingredients. The fruit is prepared by the removal of pits, seeds, skins, and cores, where such removal is usual in preparing that kind of fruit for consumption as fresh fruit. The fruit may be screened, crushed, or otherwise comminute. It may be acidulated. In the case of concentrated fruit or fruit juices, from which part of the water is removed, substances contributing flavor volatilized during water removal may be condensed and reincorporated in the concentrated fruit or fruit juice. In the case of citrus fruits, the whole fruit, including the peel but excluding the seeds, may be used, and in the case of citrus juice or concentrated citrus juices, cold-pressed citrus oil may be added thereto in an amount not exceeding that which would have been obtained if the whole fruit had been used.

Examples of nonfruit characterizing ingredients include but are not limited to the following: (1) Ground spice or infusion of coffee or tea; (2) Chocolate or cocoa, including sirup; (3) Confectionery; (4) Distilled alcoholic beverage, including liqueurs or wine and/or (5) Any food flavoring (except any having a characteristic fruit or fruit-like flavor).

Examples of sweeteners used in the present context may be sucrose, glucose, fructose, glucose syrup with different DE (dextrose equivalent), polydextrose, lactitol, inulin, xylito or a mixture thereof.

The sorbet or sherbet product may in addition comprise colourings such as beta-carotene, for example, and/or any type of flavourings or perfumes customarily used to flavour frozen confections, such as strawberry, orange and raspberry for example.

As mentioned, whereas sorbets normally do not contain fat and non-fat milk solids (MSNF), sherbet traditionally has a certain amount of fat, typically 1-3% (w/w) and/or non-fat milk solids, typically 1-4% (w/w).

Examples of fats are milk fat coming from sources such as butter oil concentrate, butter, cream and whole milk and fat coming from vegetable sources such as coconut oil, palm kernel oil and palm oil.

Examples of MSNF sources traditionally used in sherbets are skimmed milk powder, whey powder and other whey based products, whole milk powder, skimmed milk, semi-skimmed milk, whole milk, cream, condensed milk, sweetened condensed milk, butter milk powder.

Traditionally sorbet and sherbet also contain different stabilisers such example as pectin, locust bean gum, guar gum, xanthan gum, alginate, carrageenan, cellulose gum, starch and modified starch.

Further embodiments according to the invention:

Embodiment 1. A whipping agent comprising an emulsifier and a protein.

Embodiment 2. The whipping agent according to embodiment 1, wherein the emulsifier and protein are capable of forming complexes.

Embodiment 3. The whipping agent according to any one of embodiments 1 or 2, wherein the protein is a vegetable protein.

Embodiment 4. The whipping agent according to any one of embodiments 1-3, wherein the protein is an undenaturated or partly denaturated protein.

Embodiment 5. The whipping agent according to any one of embodiments 1-4, wherein the protein is a protein that freeze denaturate.

Embodiment 6. The whipping agent according to any one of embodiments 3-5, wherein the vegetable protein is selected from the group consisting of pea protein, soy protein and potato protein and mixtures thereof.

Embodiment 7. The whipping agent according to any one of embodiments 3-6, wherein the vegetable protein is potato protein.

Embodiment 8. The whipping agent according to any one of embodiments 1-7, wherein the emulsifier is ionic or non-ionic.

Embodiment 9. The whipping agent according to any one of embodiments 1-8, wherein the emulsifier is non-ionic.

Embodiment 10. The whipping agent according to any one of embodiments 1-9, wherein the emulsifier is selected from mono- and/or di-glyceride(s) of saturated or unsaturated fatty acid(s) and mixtures thereof, such as fatty acids with a chain length of C12-C22.

Embodiment 11. The whipping agent according to any one of embodiments 1-10, wherein the weight ratio of the emulsifier to the protein is between 10 and 0.01, between 10 and 0.1, preferably between 8 and 0.5, more preferably between 5 and 1.

Embodiment 12. Use of a whipping agent as defined in any one of embodiments 1-11 for making a whipped, food product.

Embodiment 13. The use according to embodiment 12, wherein the food product is frozen.

Embodiment 14. The use according to any one of embodiments 12-13, wherein the food product is sorbet or sherbet.

Embodiment 15. The use according to any one of embodiments 12-14, wherein the whipped frozen food product has improved air incorporation and distribution and/or overrun and/or smoother texture and/or better heat shock stability.

Embodiment 16. The use according to any one of embodiments 12-15, wherein the protein is used in a range of 0.01-5% (w/w), 0.01-3% (w/w), 0.01-1% (w/w), more preferred in a range of 0.05-0.5% (w/w), more preferred in a range of 0.05-0.2% (w/w).

Embodiment 17. The use according to any one of embodiments 12-16, wherein the emulsifier is used in a range of 0.01-1% (w/w), more preferred in a range of 0.05-0.5% (w/w), more preferred in a range of 0.1-0.4% (w/w).

Embodiment 18. A whipped food product comprising a whipping agent, which whipping agent is as defined in any one of embodiments 1-11.

Embodiment 19. The whipped food product according to embodiment 18, which product is frozen.

Embodiment 20. The whipped food product according to any one of embodiments 18-19 comprising the emulsifier in a range of 0.01-1% (w/w), more preferred in a range of 0.05-0.5% (w/w), more preferred in a range of 0.1-0.4% (w/w).

Embodiment 21. The whipped food product according any one of embodiments 18-20 comprising the protein in a range of 0.01-5% (w/w), 0.01-3% (w/w), 0.01-1% (w/w), more preferred in a range of 0.05-0.5% (w/w), more preferred in a range of 0.05-0.2% (w/w).

Embodiment 22. The whipped food product according to embodiment any one of embodiments 18-21 comprising less than 4% fat, less than 3% fat or less than 2% fat.

Embodiment 23. The whipped food product according to any one of embodiments 18-22 comprising less than 2% milk fat, such as between 1% and 2% milk fat.

Embodiment 24. The whipped food product according to any one of embodiments 18-23, wherein said product is sherbet or sorbet.

Embodiment 25. A method of preparing a whipped food product such as sorbet or sherbet by adding a whipping agent as defined in any one of embodiments 1-11, and, optionally heating and further whipping and optionally freezing the product.

Embodiment 26. A method for preparing complexes of emulsifier and protein comprising a step of heating a composition comprising emulsifier and protein to a temperature at or above the melting temperature of the emulsifier and/or at a temperature wherein the emulsifier creates micelles or mesophasic structures, followed by a step of cooling the heated composition optionally to below the melting temperature of the emulsifier and/or to a temperature where the emulsifier transform into a crystalline or liquid crystalline structure.

Embodiment 27. A method for preparing a whipped food product such as sorbet or sherbet by adding a whipping agent as defined in any one of embodiments 1-11, and whipping and optionally freezing the product, comprising a step of forming complexes between emulsifier and protein, and optionally forming particles of the complexes.

Embodiment 28. The method according to embodiment 27, wherein the complexes are formed during a step of heating the product after addition of the whipping agent comprising the emulsifier and protein to a temperature at or above the melting temperature of the emulsifier and/or at a temperature wherein the emulsifier creates micelles or mesophasic structures, followed by a step of cooling the heated composition optionally to below the melting temperature of the emulsifier and/or to a temperature where the emulsifier transform into a crystalline or liquid crystalline structure.

Embodiment 29. The method according to any one of embodiments 26-28, wherein the temperature during the heating step is selected such that the protein or at least part of the protein is denaturated.

Embodiment 30. The method according to any one of embodiments 26-29, wherein the ionic conditions and/or the pH during the heating step is selected such that the protein or at least part of the protein is denaturated.

Embodiment 31. The method according to any one of embodiments 26-30, wherein the complexes are disintegrated into smaller particles by mechanical treatment such as high shear treatment, for example homogenisation, mechanical treatment and air incorporation in a ice-cream freezer or mechanical treatment with ultra turrax.

Embodiment 32. The method according to embodiment 30, wherein the ionic conditions are changed by adding Ca ions.

Embodiment 33. A complex of emulsifier and protein.

Embodiment 34. A complex of emulsifier and protein formed by heating of a composition comprising emulsifier and protein to a temperature at or above the melting temperature of the emulsifier and/or at a temperature wherein the emulsifier creates micelles or mesophasic structures, followed by cooling of the mixture optionally to below the melting temperature of the emulsifier and/or to a temperature where the emulsifier transform into a crystalline or liquid crystalline structure.

Embodiment 35. The complex according to any one of embodiments 33-34, which is an aggregate.

Embodiment 36. The complex according to any one of embodiments 33-35, which is in particulate form.

Embodiment 37. The complex according to embodiments 36, which particles has a size of 10 nanometre to 100 micron, 10 nanometre to 50 micron or 10 nanometre to 10 micron or 10 nanometre to 150 nanometre.

Embodiment 38. The complex according to any one of embodiments 33-37, wherein the protein in the composition before heating is undenaturated or partly denaturated protein.

Embodiment 39. The complex according to embodiment 38, wherein the protein is a protein that freeze denaturate.

Embodiment 40. The complex according to any one of embodiments 38-39, wherein the protein is undenaturated or only partly denaturated.

Embodiment 41. The complex according to any one of embodiments 33-40, wherein the protein is a vegetable protein.

Embodiment 42. The complex according to any one of embodiments 33-40, wherein the vegetable protein is selected from the group consisting of pea protein, soy protein and potato protein and mixtures thereof.

Embodiment 43. The complex according to any one of embodiments 33-42, wherein the vegetable protein is potato protein.

Embodiment 44. The complex according to any one of embodiments 33-43, wherein the emulsifier is ionic or non-ionic.

Embodiment 45. The complex according to any one of embodiments 33-44, wherein the emulsifier is non-ionic.

Embodiment 46. The complex according to any one of embodiments 33-45, wherein the emulsifier is selected from mono- and/or di-glyceride(s) of saturated or unsaturated fatty acid(s) and mixtures thereof, such as fatty acids with a chain length of C12-C22.

Embodiment 47. The complex according to any one of embodiments 33-46, wherein the weight ratio of the emulsifier to protein such as vegetable protein is between 10 and 0.01, between 10 and 0.1, preferably between 8 and 0.5, more preferably between 5 and 1.

Embodiment 48. A whipped product comprising the complex as defined in any one of embodiments 31-47.

Embodiment 49. The whipped product according to embodiment 48, wherein the whipped product is as further defined in embodiments 18-24.

Embodiment 50. The use according to any one of embodiments 12-17, wherein the food product comprises less than less than 2% fat (w/w) or less than 0.5% (w/w).

Embodiment 51. The use according to any one of embodiments 12-17 and 50, wherein the food product is as defined in any one of embodiments 19-25.

Embodiment 52. The use according to any one of embodiments 12-17 and 50-51, wherein the whipped frozen food product comprising a whipping agent of emulsifier and protein as defined in any one of embodiments 1-11 has at least one improved property selected from the group of air incorporation, distribution, overrun, smoother texture, whipping in the presence of terpens, and better heat shock stability compared to the same whipped frozen food product comprising a whipping agent consisting solely of said emulsifier or said protein.

Example 1

The following sorbet mix were prepared and frozen:
Ingredients in % (w/w)

CREMODAN® SUPER Mono-diglyceride is a commercial mono- and diglyceride from Danisco A/S.

Solanic 306 P is a commercial product from Solanic

GRINDSTED® LBG 246 is a commercial locust bean gum from Danisco A/S

Procedure:

1. Mix liquid ingredients at 20-22° C.
2. Mix dry ingredients
3. Mix dry and liquid ingredients and increase temperature to 70° C.
4. Homogenise at 78° C./150 bar
5. Pasteurise at 84° C./30 seconds
6. Cool to 5° C.
7. Ageing overnight in ice water (2-5° C.)
8. Add 50% citric acid to pH 2.7
9. Add flavouring and colouring
10. Freezing, light extrusion, overrun 80% and filling into 250 ml cartons
11. Overnight hardening in hardening tunnel at −40° C.
12. Store at −20° C.

Sensory Evaluation of the Samples:

Fresh Samples

1. Good air cell distribution, a little brittle
2. Acceptable
3. Cold and brittle, medium-sized air cells
4. Brittle and very bad air distribution, very big air bubbles
5. Fine texture, good air distribution The sorbet samples were exposed to heat shock treatment. The following heat shock treatment was used:

The products were tempered and stored in a freezer cabinet at −18° C. When the products had been tempered, they were placed in a heat shock freezer cabinet, where the temperature varied between −20° C. and −5° C. every 6 hours. The products were kept in this freezer cabinet for 7 days.

All samples were tempered at −18° C. for 2 days before being evaluated.

Heat Shock Treated Samples

1. Shrinkage, cold eating, icy
2. Cold eating, slightly icy
3. Brittle, icy and rough
4. Very bad, very big air bubbles, like a cheese with big holes
5. Smooth, best of the 5 samples

| Ingredient Name | 1 | 2 | 3 | 4 | 5 |
|---|---|---|---|---|---|
| Sucrose | 24.000 | 24.000 | 24.000 | 24.000 | 24.000 |
| Glucose syrup powder 32 DE, 95% TS | 6.000 | 6.000 | 6.000 | 6.000 | 6.000 |
| GRINDSTED ® LBG 246 | 0.200 | 0.200 | 0.200 | 0.200 | 0.200 |
| Whey protein concentrate 80 | 0.100 | | | | |
| Methylcellulose | | 0.100 | | | |
| Solanic 306 P | | | 0.100 | 0.200 | 0.100 |
| CREMODAN ® SUPER Mono-diglyceride | | | | | 0.200 |
| Lime Green Colour (green/yellow) | 0.050 | 0.050 | 0.050 | 0.050 | 0.050 |
| Lemon Flavouring T10251 from Firmenich | 0.200 | 0.200 | 0.200 | 0.200 | 0.200 |
| Citric acid solution (50% W/W) | | | | | |
| Water (Tap) | 69.450 | 69.450 | 69.450 | 69.350 | 69.250 |
| Total % | 100 | 100 | 100 | 100 | 100 |

Conclusion:

The combination of potato protein (Solanic 306 P) and mono- and diglyceride (CREMODAN® SUPER Monoglyceride) gave excellent and better results than potato protein or mono- and diglyceride used alone as whipping agent in the sorbet application.

Example 2

The following sorbet mix were prepared and frozen: Ingredients in % (w/w)

| Ingredient Name | 1 | 2 | 3 |
|---|---|---|---|
| Water (Tap) | 69.130 | 69.030 | 68.930 |
| Sucrose | 20.000 | 20.000 | 20.000 |
| Glucose syrup powder 32 DE, 95% TS. | 7.000 | 7.000 | 7.000 |
| Orange concentrate 65 brix | 3.500 | 3.500 | 3.500 |
| CREMODAN ® SUPER Mono-diglyceride | | 0.200 | 0.200 |
| Solanic 306 P | 0.100 | | 0.100 |
| GRINDSTED ® LBG 246 | 0.050 | 0.050 | 0.050 |
| Firmenich Orange juice 055604 T (flavouring) | 0.020 | 0.020 | 0.020 |
| BetaCarotene (yellow colouring) | 0.200 | 0.200 | 0.200 |
| Total % | 100 | 100 | 100 |

Mix no. 1: With potato protein (Solanic 306 P) as sole whipping agent.

Mix no. 2: With mono- and diglyceride (CREMODAN® SUPER Mono-diglyceride) as sole whipping agent.

Mix no. 3: With combination of potato protein (Solanic 306 P) and mono- and diglyceride (CREMODAN® SUPER Mono-diglyceride) as whipping agent.

Procedure:

1. Mix liquid ingredients at 20-22° C.
2. Mix dry ingredients
3. Mix dry and liquid ingredients and increase temperature to 70° C.
4. Homogenise at 78° C./150 bar
5. Pasteurise at: 84° C./30 sec
6. Cool to 5° C.
7. Ageing overnight in ice water (2-5° C.)
8. Add 50% citric acid to pH: 3.0
9. Add flavouring and colouring
10. Freezing, light extrusion, target overrun: 100%, drawing temperature: −5.7° C.
11. Fill
12. Overnight freezing in hardening tunnel at −40° C.
13. Store at −20° C.

Performance on the Freezer:

Mix no. 1: It was only possible to get 10% overrun into the mix as the whipping effect of the mix was very poor the sorbet showed big air bubbles when leaving the freezer, very poor air incorporation.

Mix no. 2: It was only possible to get 30% overrun into the mix as the whipping effect of the mix was very poor, the sorbet showed big air bubbles when leaving the freezer, poor air incorporation.

Mix no. 3: Target overrun of 90% was easy to reach, with fin air incorporation.

Sensory Evaluation of the Samples

Fresh Samples Stored at −18° C. for 2 Days:

Sample no. 1: Very hard and brittle structure, very poor air incorporation, very cold eating sensation, very poor air incorporation.

Sample no. 2: Hard and brittle structure, poor air incorporation, cold-eating sensation.

Sample no. 3: Very smooth and fine, very fine air incorporation.

Example 3

The following sorbet mix were prepared and frozen: Ingredients in % (w/w)

| Ingredient Name | 1 | 2 |
|---|---|---|
| Sucrose | 16.000 | 16.000 |
| Glucose syrup powder 32 DE, 95% TS. | 6.000 | 6.000 |
| Black Currant concentrate (65 brix) | 10.000 | 10.000 |
| Solanic 306 P | 0.100 | 0.100 |
| GRINDSTED ® LBG 246 | 0.130 | 0.130 |
| MEYPRODOR ™ 50 (Guar gum) | 0.120 | 0.120 |
| CREMODAN ® SUPER Mono-diglyceride | 0.250 | |
| Polysorbate 80 (E433) | | 0.250 |
| Water (Tap) | 67.400 | 67.400 |
| Total % | 100 | 100 |

MEYPRODOR™ 50 is a commercial depolymerised guar gum from Danisco A/S

Mix no. 1: With combination of potato protein (Solanic 306 P) and mono- and diglycerides (CREMODAN® SUPER Mono-diglyceride) as whipping agent Mix no. 2: With combination of potato protein (Solanic 306 P) and polysorbate 80 (E433) as whipping agent Procedure:

1. Mix liquid ingredients at 20-22° C.
2. Mix dry ingredients
3. Mix dry and liquid ingredients and increase temperature to 70° C.
4. Homogenise at 78° C./150 bar
5. Pasteurise at: 84° C./30 sec
6. Cool to 5° C.
7. Ageing overnight in ice water (2-5° C.)
8. Add flavouring and colouring
9. Freezing, light extrusion, overrun: 80%
10. Fill
11. Overnight freezing in hardening tunnel at −40° C.
12. Store at −20° C.

Performance on the Freezer:

Both mix no. 1 and 2 had fine air incorporation. No problem achieving 80% overrun in the sorbet samples.

Sensory Evaluation of the Samples

Fresh Samples Stored at −18° C. for 2 Days:

Texture (very smooth), body and air distribution was fully acceptable for both sample no. 1 and 2, although sample no. 2 had some off-taste of polysorbate 80.

Example 4

The following sorbet mix were prepared and frozen:

Ingredients in % (w/w)

| Ingredient Name | 1 | 2 | 3 | 4 | 5 |
|---|---|---|---|---|---|
| Water (Tap) | 69.580 | 69.680 | 69.480 | 69.680 | 69.480 |
| Sucrose | 25.000 | 25.000 | 25.000 | 25.000 | 25.000 |
| Gl. syr. p. 32DE 95% TS | 5.000 | 5.000 | 5.000 | 5.000 | 5.000 |
| CREMODAN ® SUPER Mono-diglyceride | 0.200 | | 0.200 | | 0.200 |
| GRINDSTED ® LBG 246 | 0.200 | 0.200 | 0.200 | 0.200 | 0.200 |
| Nutralys F85F | | 0.100 | 0.100 | | |
| Alpha 12 | | | | 0.100 | 0.100 |
| C - Lemon 504196 A from Firmenich | 0.020 | 0.020 | 0.020 | 0.020 | 0.020 |
| Total % | 100 | 100 | 100 | 100 | 100 |

Nutralys F85F is a Commercial Pea Protein Isolate from Roquette.

Alpha 12 is a Commercial Soyprotein Concentrate from Solae.

Procedure:

1. Mix liquid ingredients at 20-22° C.
2. Mix dry ingredients
3. Mix dry and liquid ingredients and increase temperature to 70° C.
4. Homogenise at 78° C./150 bar
5. Pasteurise at: 84° C./30 sec on plate heat exchanger
6. Cool to 5° C.
7. Add 50% citric acid to pH: 3.00
8. Add flavouring
9. Ageing 1 hour
10. Freeze on ice cream freezer with no overrun
11. Freeze on ice cream freezer with 80% overrun
12. Fill in cartons
13. Store at −25° C.

Evaluation of Sorbet Samples

| Sample | Obtainable overrun, % | Sensory evaluation |
|---|---|---|
| 1 | 30 | Brittle, poor air incorporation |
| 2 | 15 | Hard, brittle, very poor air incorporation |
| 3 | 70 | Smooth, creamy, fine air incorporation |
| 4 | 15 | Hard, brittle, very poor air incorporation |
| 5 | 45 | Slightly hard, medium air incorporation |

Example 5

The following sorbet mix were prepared and frozen:

Ingredients in % (w/w)

| Ingredient Name/recipe | 1 | 2 | 3 |
|---|---|---|---|
| Water (Tap) | 69.68 | 69.58 | 69.48 |
| Sucrose | 25.00 | 25.00 | 25.00 |
| Gl. syrup 32DE 95% TS | 5.00 | 5.00 | 5.00 |
| Potato protein | 0.10 | | 0.10 |

-continued

| Ingredient Name/recipe | 1 | 2 | 3 |
|---|---|---|---|
| Monodiglyceride (MDG) | | 0.20 | 0.20 |
| Locust bean gum | 0.20 | 0.20 | 0.20 |
| Lemon flavour | 0.02 | 0.02 | 0.02 |
| Total % | 100.00 | 100.00 | 100.00 |

Procedure:

1. Mix liquid ingredients at 20-22° C.
2. Mix dry ingredients
3. Mix dry and liquid ingredients and increase temperature to 70° C.
4. Homogenise at 78° C./150 bar
5. Pasteurise at: 84° C./30 sec on plate heat exchanger
6. Cool to 5° C.
7. Ageing overnight in ice water (2-5° C.)
8. Add 50% citric acid to pH 3.00
9. Add flavouring
10. Freezing, light extrusion, target overrun: 100%
11. Fill
12. Overnight freezing in hardening tunnel at −40° C.

Evaluation of Sorbet Samples

With Potato Protein Alone (Recipe 1):

Overrun: 40%

Poor air incorporation, brittle

With MDG Alone (Recipe 2):

Overrun: 50%

Poor air incorporation. However incorporated air was finely distributed

With Potato Protein and MDG (Recipe 3)

Overrun: 100%

Good air incorporation with fine distribution, good body.

The above sorbet recipes 2 and 3 were further evaluated using light microscopy, polarised light microscopy and confocal laser scanning microscopy. The results are shown in FIG. 1. The light microscopy shows the shape and size of particles in the sorbet mix. The polarised light microscopy shows crystals or liquid crystalline structures, created by the emulsifier. The confocal scanning pictures shows specific localisation of protein and emulsifier structures, where the emulsifier part is coloured red, using Nile red as dye, and where the protein is coloured green, using FITC as dye. In FIG. 1 the first row of pictures show the particle structures in the unfrozen sorbet mix of recipe 2, where the MDG is seen as relatively big condensed crystalline structures. The second rows of pictures show the structures in the unfrozen sorbet mix of recipe 3, where big aggregated structures of small crystalline emulsifier and small protein structures are seen, indicating aggregated complexes, already created in bulk and not at the interface during whipping. The third row of pictures show the structures in the frozen and mechanically treated sorbet mix of recipe 3, where the big aggregate structures are broken down to very small structures, which contain crystalline parts but also protein parts, indicating complexing.

Stabilisation of interphases by emulsifier-protein complexes is illustrated in FIG. 2. FIG. 2 shows pictures of zeta potential measurements, made by preparing 10% o/w emulsions of the sorbet mixes of recipe 1, 2 and 3 adding rape seed oil while homogenising (ultra turrax). Emulsions are made from recipe 1, 2 and 3 both evaluating the sorbet mixes before and after a freezing process. It can be seen that recipe 2 results in a negative zeta potential, Recipe 1 results in a positive zeta potential, whereas the combination of MDG and potato protein in recipe 3 results in a zeta potential close to 0. This implies that MDG and potato protein binds together at the oil/water interface, supporting the microscopy data, that a complex has been formed. The data also indicate that the complexes are formed before freezing, again supporting the microscopy findings.

FIG. 3 shows the impact of freezing and mechanical treatment on foaming properties. FIG. 3 shows a foaming test, which has been performed on the sorbet mix from example 5 recipe 3. The foaming test was performed on a FoamScan instrument from the company Teclis. Foam is created by blowing nitrogen through a glass frit into the sample. The experiment was run by incorporating nitrogen, until a foam volume of 120 ml was reached, using 40 ml of sorbet mix for the foaming experiment. Then the foam volume was followed over time as well as the liquid content of the foam over time (based on conductivity measurement at a specific foam height). As can be seen the freezing have a certain effect on the foam volume and water retention in the foam, but it especially the mechanical treatment that dramatically improves foam volume stability and water retention capability. This support the microscopy results, that by breaking down the aggregated complexes to very small particulate complexes of emulsifier and protein, a strong foam stabilisation is achieved.

FIG. 4 shows the size of particulate structures using nanoparticle tracking analysis with the NTA2.2 (Nanosight Ltd.m UK) for sorbet mixes after freezing and subsequent ultra turrax treatment where the sorbet mix are of recipe 1, 2 and 3 of example 5. The nanoparticle tracking method detect particle size of each individual particle by tracking the Brownian movements of the particle. This is an especially preferred technique compared to more traditional light scattering techniques, when a broad or a polymodal particle size distribution exists. It is seen that particles of nanosize are created, but especially small particles are obtained for the sorbet mix with the MDG and potato protein combination.

Example 6

The following sorbet mix were prepared and frozen:
Ingredients in % (w/w)

| Ingredient Name | 1 | 2 |
|---|---|---|
| Water (Tap) | 69.600 | 68.980 |
| Sucrose | 25.000 | 20.000 |
| Glucose syrup powder 32 DE, 95% TS. | 5.000 | 7.000 |
| Orange concentrate 65 brix | | 3.500 |
| Flavouring | 0.100 | |

-continued

| Ingredient Name | 1 | 2 |
|---|---|---|
| Flavouring | | 0.020 |
| BetaCarotene (yellow colour) | | 0.200 |
| GRINDSTED ® LBG 246 | 0.200 | 0.200 |
| DairinQ 302 P (potato protein)* | 0.100 | 0.100 |
| Total % | 100 | 100 |

*Commercial potato protein from Solanic

Procedure:
1. Mix liquid ingredients at 20-22° C.
2. Mix dry ingredients
3. Mix dry and liquid ingredients and add 50% citric acid to pH: 2.7 (before pasteurisation)
4. Increase temperature to 70° C.
5. PHE pasteurise at: 84° C./30 sec
6. Cool to 5° C.
7. Ageing overnight in ice water (2-5° C.)
8. Add flavouring and colouring
9. Freezing, light extrusion, overrun target: 100%
10. Fill
11. Store at –20° C.

Mix no. 1 is based on flavouring (no fruit concentrate)
Mix no. 2 is based on flavouring and orange concentrate
The following drawing temperatures and overrun were observed from the freezer:

| | 1 | 2 |
|---|---|---|
| Drawing temp. [° C.] | –6.6 | –6.5 |
| Overrun (%) | 100 | 30 |

No significant deviations in the recorded drawing temperature were observed.

The sorbet was analyzed by sensorial testing and the following was observed:

| | 1 | 2 |
|---|---|---|
| Sensory, descriptions | Fine structure, creamy mouthfeel, good flavour release | brittle structure, poor air incorporation (very big air bubbles), cold-eating |

These trials showed that potato protein (in this case DairinQ 302 P), can function as sole whipping agent (formulation 1) in sorbet, when pH is adjusted before heating and homogenisation, but not when fruit components are present like in trial no. 2 (where orange concentrate is used).

Various modifications and variations of the described embodiments will be apparent to those skilled in the art without departing from the scope and spirit of those embodiments. It should be understood that the subject matters as claimed should not be unduly limited to such specific embodiments. Indeed, various modifications of the described modes for carrying out the embodiments that are obvious to those skilled in the art are intended to be within the scope of the following claims.

All references discussed herein are incorporated herein by reference for all purposes.

The invention claimed is:

1. A whipped food product, wherein:

the food product comprises a whipping agent, the whipping agent comprises a non-ionic emulsifier and potato protein, the weight ratio of the non-ionic emulsifier to the potato protein in the whipping agent is between 10 and 0.01, and the whipped food product comprises less than 2% (w/w) fat.

2. The whipped food product according to claim 1, which product is frozen.

3. The whipped food product according to claim 1 comprising the emulsifier in a range of 0.01-1% (w/w).

4. The whipped food product according to claim 1 comprising the protein in a range of 0.01-5% (w/w).

5. The whipped food product according to claim 1, wherein less than 2% (w/w) fat comprises milk fat.

6. The whipped food product according to claim 1, wherein said product is sherbet or sorbet.

* * * * *